US007489237B2

(12) United States Patent
Fisher et al.

(10) Patent No.: US 7,489,237 B2
(45) Date of Patent: Feb. 10, 2009

(54) METHOD, SYSTEM, AND COMPUTER PROGRAM PRODUCT FOR IMPLEMENTING MULTI-TIERED MANAGEMENT OF SECURITY SYSTEMS

(75) Inventors: Gerald Fisher, Brainerd, MN (US); Theodore A. Nesse, Stillwater, MN (US); Venkata Seshu Satyanarayana Perali, Andhra Pradesh (IN); Sunil Neckaraje, Karnataka (IN); Ramesh Duraipandian, Madurai District-Tamil Nadu (IN)

(73) Assignee: General Electric Company, Schenectady, NY (US)

( * ) Notice: Subject to any disclaimer, the term of this patent is extended or adjusted under 35 U.S.C. 154(b) by 377 days.

(21) Appl. No.: 11/160,598

(22) Filed: Jun. 30, 2005

(65) Prior Publication Data

US 2007/0001834 A1    Jan. 4, 2007

(51) Int. Cl.
*G08B 29/00*    (2006.01)
(52) U.S. Cl. .................... 340/506; 340/3.1; 340/517; 340/521; 340/825.36; 340/825.49

(58) Field of Classification Search ............... 340/506, 340/3.1, 517, 521, 825.36, 825.49
See application file for complete search history.

(56) References Cited

U.S. PATENT DOCUMENTS 5,400,246 A  *  3/1995  Wilson et al. ............... 700/17

* cited by examiner

*Primary Examiner*—Daryl C Pope
(74) *Attorney, Agent, or Firm*—Eugene Hyun, Esq.; Armstrong Teasdale LLP

(57) ABSTRACT

A method, system, and computer program product for implementing multi-tiered management of security systems is provided. The method includes listing activities for implementing a security management system and identifying information, systems, and processes needed to execute the activities. The method also includes defining a set of roles and associating selected activities with each role in the set. The roles include an administrator role, a dealer role, a service entity role, a local responder role, and a security subject role. The method further includes assigning access capabilities for each of the roles based upon the associated activities and corresponding information, systems, and process requirements. The method also includes storing results of the listing, identifying, defining, and assigning in a role assignment database.

20 Claims, 8 Drawing Sheets

METHOD, SYSTEM, AND COMPUTER PROGRAM PRODUCT FOR IMPLEMENTING MULTI-TIERED MANAGEMENT OF SECURITY SYSTEMS

BACKGROUND OF THE INVENTION

The present disclosure relates generally to security systems, and in particular, to a method, system, and computer program product for implementing multi-tiered management of security systems.

Security systems provide individuals with a sense of security and comfort. Some systems provide minimal security features (e.g., motion detection lighting), while others provide more extensive security features (e.g., electronic surveillance and automated alarm capabilities). Security system services typically involve monitoring activities at a location specified by a customer and generating some type of alert if some condition is met (e.g., security alarm activated).

Due to the growth of various communications and related technologies (wireless technologies, security sensing devices, etc.) as well as a continuing need for improved security systems, there is becoming a greater need for systems and processes that can manage these complex security systems.

BRIEF DESCRIPTION OF THE INVENTION

The above disadvantages and shortcomings are overcome or alleviated by a method, system, and computer program product for implementing multi-tiered management of security systems. The method includes listing activities for implementing a security management system and identifying information, systems, and processes needed to execute the activities. The method also includes defining a set of roles and associating selected activities with each role in the set. The roles include an administrator role, a dealer role, a service entity role, a local responder role, and a security subject role. The method further includes assigning access capabilities for each of the roles based upon the associated activities and corresponding information, systems, and process requirements. The method also includes storing results of the listing, identifying, defining, and assigning in a role assignment database.

BRIEF DESCRIPTION OF THE DRAWINGS

Referring to the exemplary drawings wherein like elements are numbered alike in the accompanying FIGURES.

DETAILED DESCRIPTION OF THE INVENTION

The security management system of the present invention facilitates multi-tiered management of security systems and processes. The tiers include, in order of greatest to least access and control capabilities, an administrator level, a dealer level, a service entity level, a local responder level, and a security subject level. Each level performs a pre-defined set of activities and, together, provides an end-to-end security management system for customer accounts.

Figure 1:
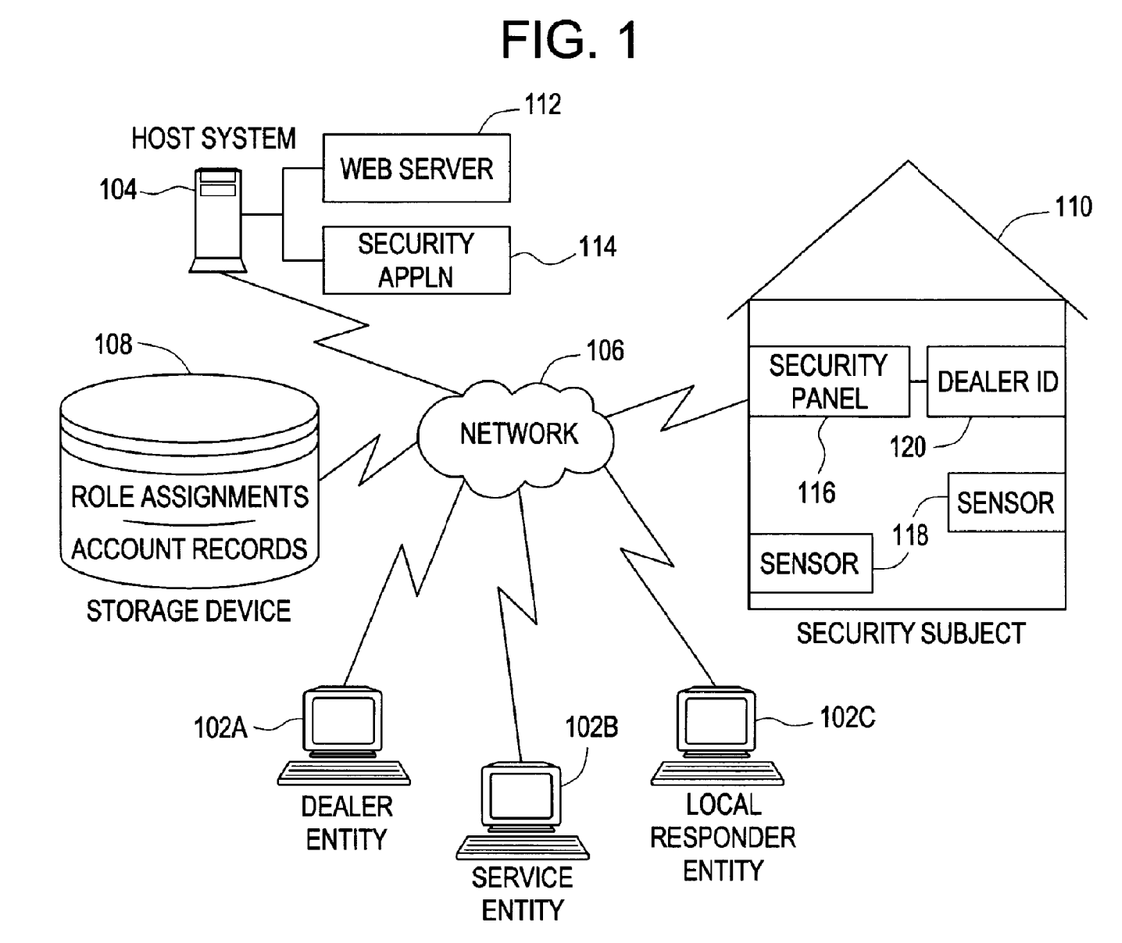
FIG. 1 is a block diagram of a system upon which the security system may be implemented in exemplary embodiments.

The system depicted in FIG. 1 includes one or more user systems 102 through which users at one or more geographic locations may contact a host system 104. The host system 104 executes computer instructions for establishing and maintaining security accounts and implementing related security functions (e.g., monitoring, reporting, etc.) via a network (e.g., network 106). The user systems 102 are coupled to the host system 104 via one or more networks, such as network 106. The host system 104 may be an application service provider (ASP) for providing security system services, including managing accounts for multiple independent dealers. The host system 104 provides multi-tiered access to security account information and systems. Tiers include, in order of greatest to least access and control capabilities, an administrator level, a dealer level, a service level, a local responder level, and a security subject level as described herein. The administrator level represents the highest level and has the greatest level of access to dealer accounts, information, and systems. The administrator level may implement security functions via host system 104, such as controlling web-based operation of the security functions and control over the operations and access of all lower level users (e.g., dealers, service entities, local responders, and security subjects).

User systems 102A-102C include a dealer entity 102A, a service entity 102B, and a local responder entity 102C. A dealer refers to an entity or individual that hosts security panels under, e.g., a contract monitoring agreement. The dealer monitors the communication and alarms generated by panels at security subject sites for which it is responsible. The dealer dispatches law enforcement to the subject location if needed. These, and other, functions may be implemented via, e.g., a web site provided by the host system 104 and a web server 112. While only one dealer entity is shown in the system of FIG. 1, it will be understood that multiple independent dealer entities may be serviced by the security management system.

A service entity refers to an entity or individual that services security panels for multiple security subjects under the direction of a dealer. The servicing includes installation, maintenance, and repair of security panels. Each service entity reports to a single dealer entity. The service entity employees are tasked with creating subject security accounts via, e.g., a web site of the host system 104 and web server 112, and may update account information relating to security subjects such as name and address information. The service entity may also configure the parameters within security panels at a subject location (e.g., 110) that represent which sensors are communicating to the security panel within the location and give the sensors names or identifications that may be displayed at the web site. Each service entity may configure multiple employees to access the functions of the security system application 114 as needed.

Local responders refer to individuals or entities responsible for monitoring groups of security subject locations such as a gated community, a condominium, hotel, etc. These typically involve on-site monitoring operations. The service entity or dealer may assign a security panel within a subject location to be monitored by the local responder using, e.g., one or more web pages provided by web server 112 designed to perform this operation. Again, multiple individuals or employees for each local responder entity may be assigned to a dealer via the dealer account. In exemplary embodiments, this category of users, however, is limited to monitoring alarms and is not provided with capabilities to arm or disarm the security panels, nor control the panels within a subject location.

The security subject refers to an entity or location for which the security system services are provided. The security subject may be a home, office, building, organization, complex, etc., and its occupants or authorized representatives are provided with the ability to monitor and control its associated security panel(s). Authorized individuals of the security subject locations may arm/disarm panels, remotely control appliances and lights assigned to panels, setup notification routes to be telephoned or emailed in case of an alarm, etc.

Each of user systems 102A-102C may be implemented using a general-purpose computer executing a computer program for carrying out the processes described herein. The user systems 102 may be personal computers (e.g., a lap top, a personal digital assistant, etc.) or host attached terminals. If the user systems 102 are personal computers, the processing described herein may be shared by the user systems 102 and the host system 104 (e.g., by providing an applet to the user systems 102).

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. One or more user systems 102 may be coupled to the host system through multiple networks (e.g., intranet and Internet) so that not all user systems 102 are coupled to the host system 104 through the same network. One or more of the user systems 102 and the host system 104 may be connected to the network 106 in a wireless fashion. In one embodiment, the network is an intranet and one or more user systems 102 execute a user interface application (e.g. a web browser) to contact the host system 104 through the network 106. In another exemplary embodiment, a user system 102 is connected directly (i.e., not through the network 106) to the host system 104 and the host system 104 is connected directly to or contains the storage device 108.

The storage device 108 includes data relating to accounts (e.g., dealer and security subject accounts) and role-based assignments and may be implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. Information stored in the storage device 108 may be retrieved and manipulated via the host system 104 and/or via authorized user systems 102.

In exemplary embodiments of the present invention, the host system 104 operates as a database server and coordinates access to application data including data stored on the storage device 108.

The host system 104 depicted in FIG. 1 may be implemented using one or more servers operating in response to a computer program stored in a storage medium accessible by the server. The host system 104 may operate as a network server (e.g., a web server 114) to communicate with the user systems 102. The host system 104 handles sending and receiving information to and from the user systems 102 and can perform associated tasks. The host system 104 may also include a firewall to prevent unauthorized access to the host system 104 and enforce any limitations on authorized access. For instance, an administrator may have access to the entire system and have authority to modify portions of the system. A firewall may be implemented using conventional hardware and/or software as is known in the art.

The host system 104 may also operate as an application server. The host system 104 executes one or more computer programs (i.e., the security system application) to provide security functions. Processing may be shared by the user systems 102 and the host system 104 by providing an application (e.g., java applet) to the user systems 102. Alternatively, the user systems 102 can include stand-alone software applications for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

As described above, security subject 110 refers to the entity or location for which the security services are implemented. One or more security panels (e.g., security panel 116) are disposed within security subject 110. Security panel 116 communicates with host system 104 via, e.g. HTML commands and server-side script technology that enables scripts embedded in web pages to be executed by a network server. Security panel 116 refers to a console that includes, e.g., a control panel, keypad, status lights and/or LCD screen, clock functions, alarm, and speaker/microphones. The control panel may also include a processor that enables an authorized representative of security subject 110 to program its internal security system functions and, optionally, access features of the security system application 114. Alternatively, the security system application 114 may be accessed via a personal computer at the security subject location 110 or remotely from a suitable communications device.

Sensors 118 are located within or around the security subject 110 and are in communication with the security panel 116. Sensors 118 may include any type of sensing device such as a motion detector, fire/smoke detector, water sensor, temperature sensor, etc. Sensors 118 on windows or glass doors may comprise audio-based units capable of recognizing a pattern of breaking glass across a full audio band. In addition, automated systems such as window/door opening and closing devices or appliances in security subject 110 (e.g., lighting, televisions, or other devices that give the appearance that the security subject is occupied) may be in communication with the security panel 116. Sensors 118 may be located in proximity of the security subject 110, e.g., lighting fixtures on property grounds or gateway. Sensors 118 are in communication with security panel 116 via hardwiring means or wireless means. Additionally, video cameras may be implemented for sensing motion and triggering an alarm at the security panel 116.

As described above, an individual associated with security subject 110 may program security settings into the security application 114 via, e.g., a home computer, a processor associated with the security panel 116, or other suitable processing device. As shown in the system of FIG. 1, a dealer identification 120 is programmed into the security panel 116, by e.g., a service entity upon installation, for associating the security panel 116 with a specific dealer account.

Figure 2:
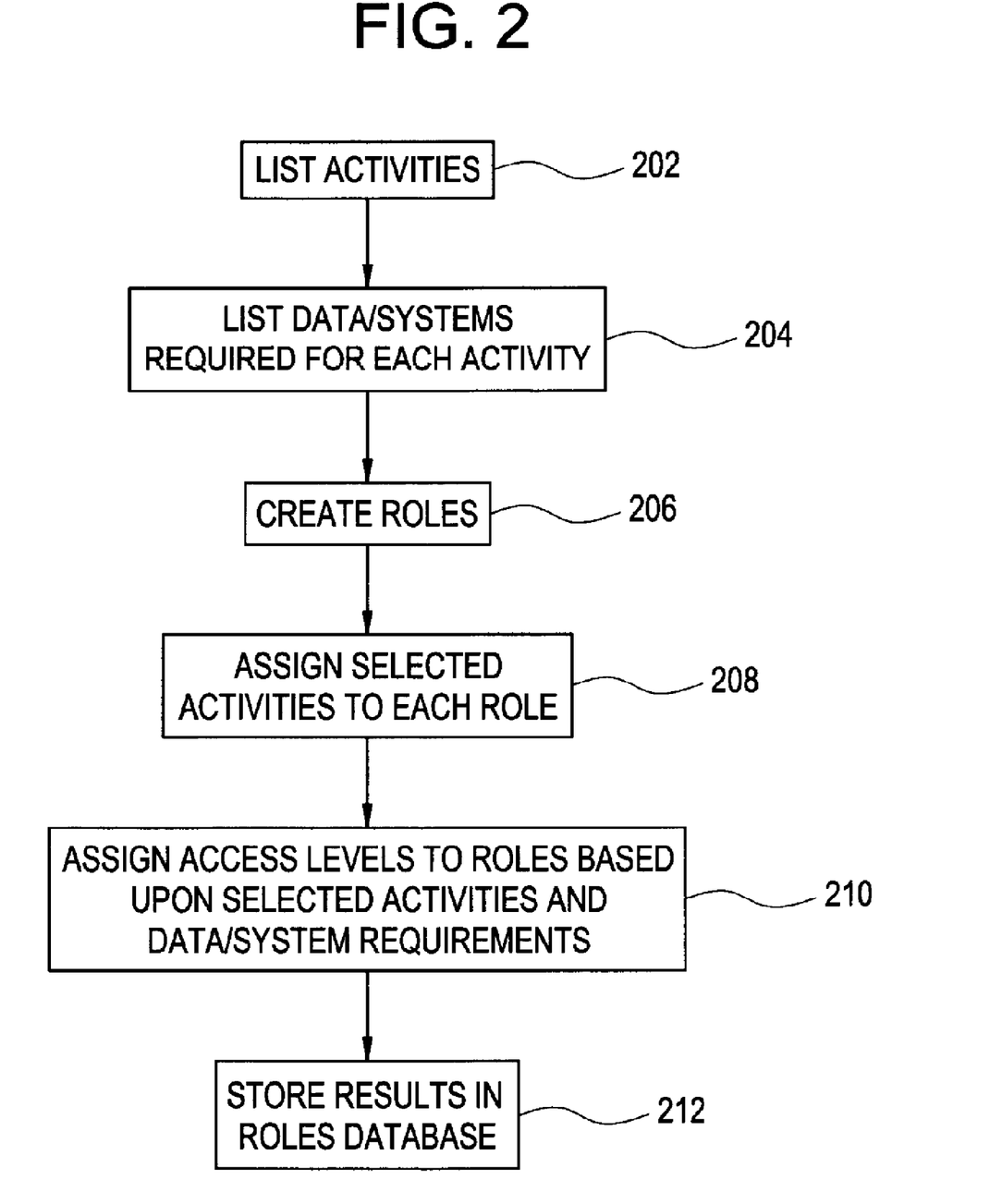
FIG. 2 is a flow diagram describing a process for creating a multi-tiered roles database based upon data, systems, and process requirements in exemplary embodiments.

Turning now to FIG. 2, a flow diagram describing a process for creating a multi-tiered roles database based upon data and systems requirements will now be described in accordance with exemplary embodiments. All activities associated with security and related management processes are identified at step 202. At step 204, all data, systems, and processes that are required in order to execute the activities of step 202 are identified. A set of roles is created and defined at step 206. The roles include administrator, dealer, service entity, local responder, and subject security.

At step 208, selected activities are assigned to each of the roles such that all of the activities are accounted for. Some of these activities may be listed under one or more roles (i.e., overlapping). At step 210, access levels are assigned to each of the roles based upon the selected activities and data, system, and processing requirements. For example, a local responder would need access to security display devices and data for monitoring a security subject location. The results of these steps 202-210 are stored in a role assignment database in storage device 108 at step 212. An administrator of host system 104 is now ready to create and manage dealer accounts.

Figure 3:
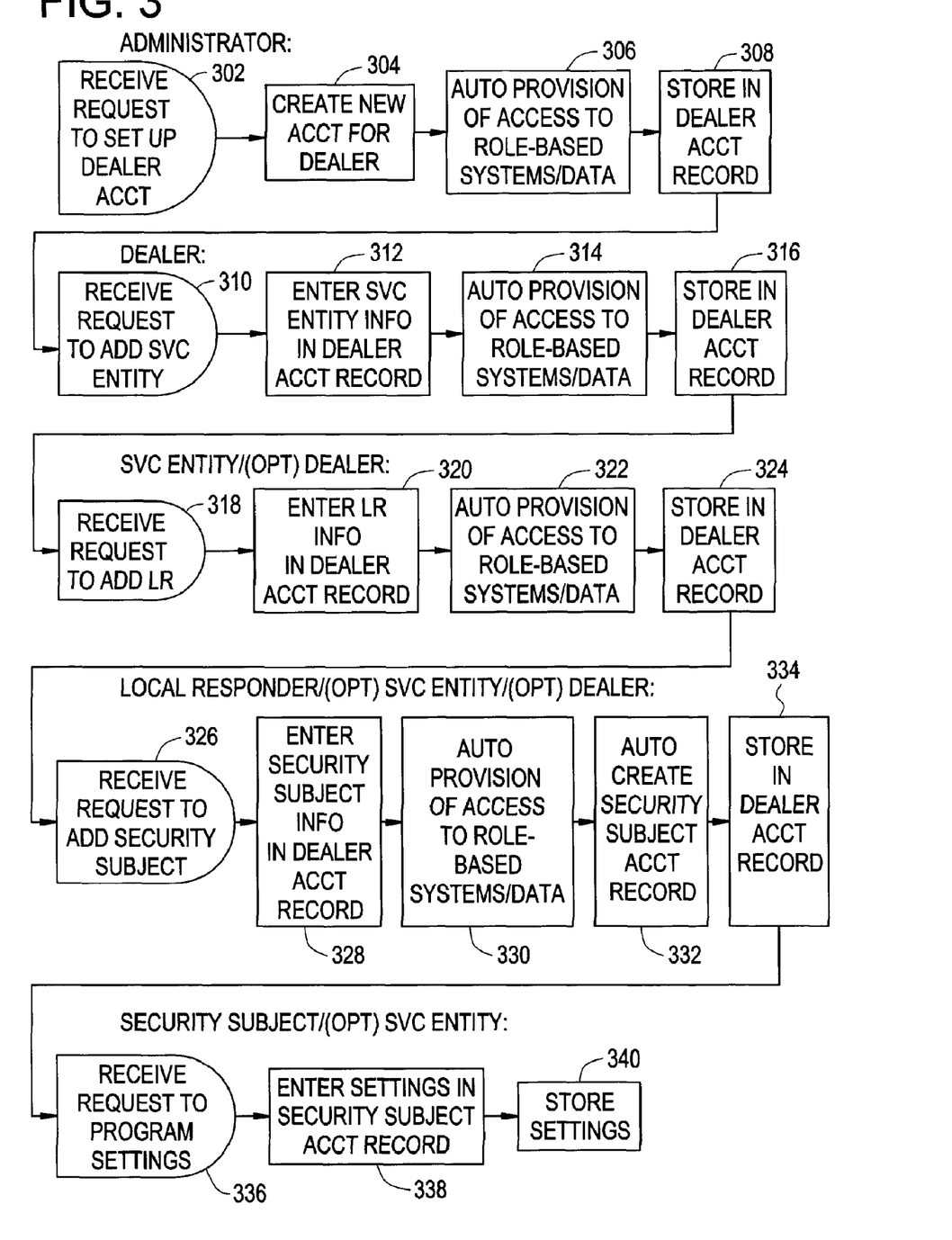
FIG. 3 is a flow diagram describing a process for implementing the security management system in exemplary embodiments.

Turning now to FIG. 3, a process for implementing the security management system in accordance with exemplary embodiments will now be described. As shown in FIG. 3, various activities are broken down by specific role assignments. For example, steps 302-308 relate to administrator activities. Steps 310-316 relate to dealer activities. Steps 318-324 relate to service entity activities. Steps 326-334 relate to local responder activities. Steps 336-340 relate to security subject activities. It will be noted however, that a portion of these steps may be optionally performed by higher-level roles (e.g., steps 318-324 may be performed by a service entity or dealer).

Figure 4:
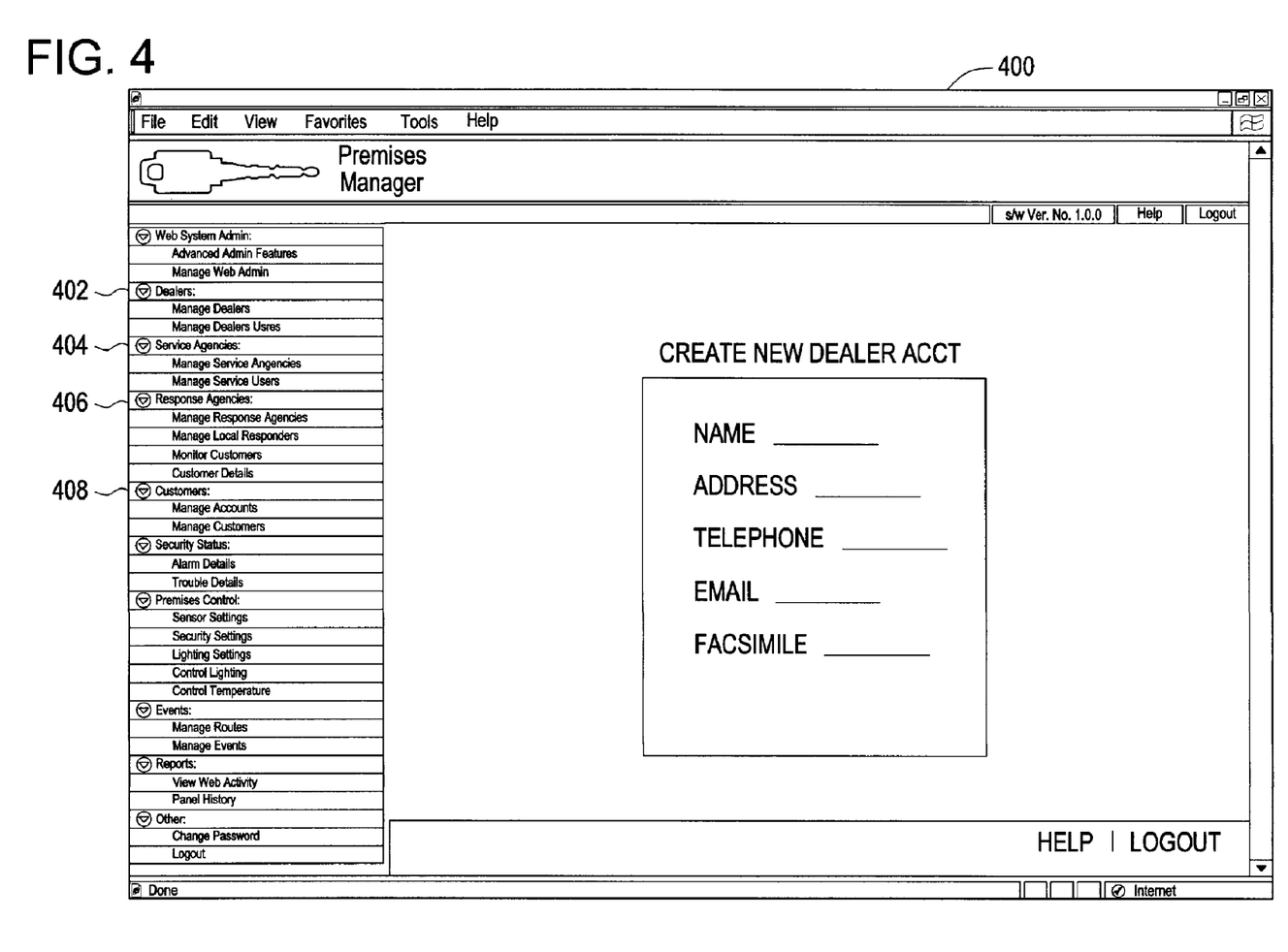
FIG. 4 is a user interface screen depicting sample data and options available to an administrator of the security system in exemplary embodiments.

At step 302, an administrator receives a request (e.g., via the web site of host system 104) to set up a new dealer account. The administrator logs into the security application 114 and a user interface screen is presented to the administrator based upon the administrator role assignment. A sample user interface screen is shown in FIG. 4. At step 304, the administrator creates a new account for the dealer by selecting option 402 on user interface screen 400 and entering dealer information (e.g., identification, address, contact information, etc.). Once the new account has been created, the security application 114 automatically provisions access permissions to the dealer account based upon the assigned dealer role established in the role assignment database at step 306. The dealer account information is then stored in a dealer account record in storage device 108 at step 308. Steps 302-308 may be repeated for each new dealer request. The new account is now ready for access by the respective dealer as described in steps 310-316.

Figure 5:
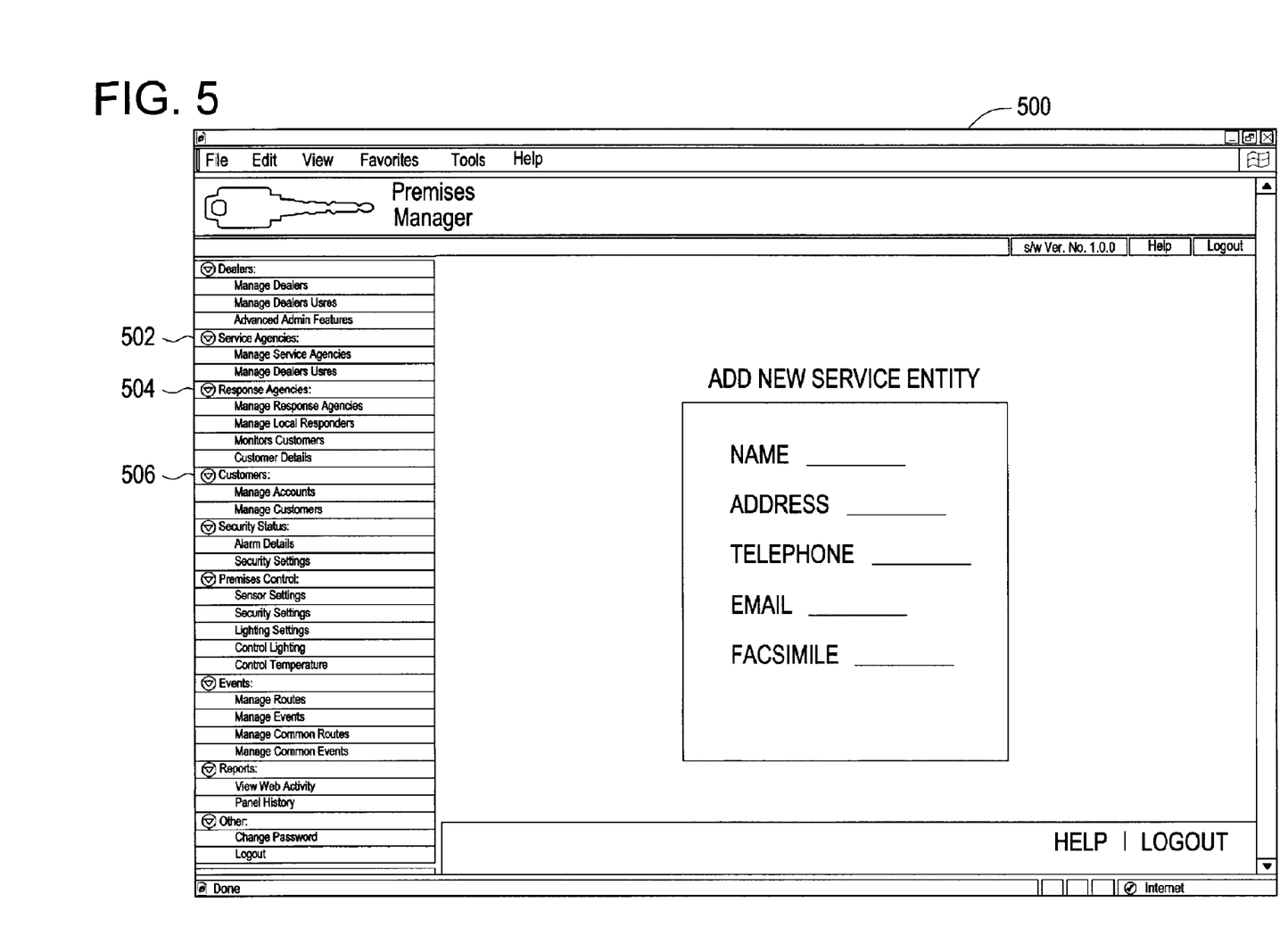
FIG. 5 is a user interface screen depicting sample data and options available to a dealer associated with the security system in exemplary embodiments.

At step 310, the dealer receives a request to add a service entity to the dealer account via, e.g., the web site of host system 104. The dealer logs into the security application 114 and a user interface screen is presented to the dealer based upon the dealer role assignment. A sample user interface screen is shown in FIG. 5. At step 312, the dealer enters information relating to the service entity (e.g., identification, address, contact information, etc.) via option 502 of user interface screen 500 and the saves the information in the dealer account record. Once the service entity information has been entered, the security application 114 automatically provisions access permissions to the service entity account based upon the assigned service entity role at step 314. The service entity information is then stored in the dealer account record in storage device 108 at step 316. Steps 310-316 may be repeated for each new service entity request received by the dealer. Based upon the service entity role assignment, the service entity may now access selected information and systems via the security application 114.

Figure 6:
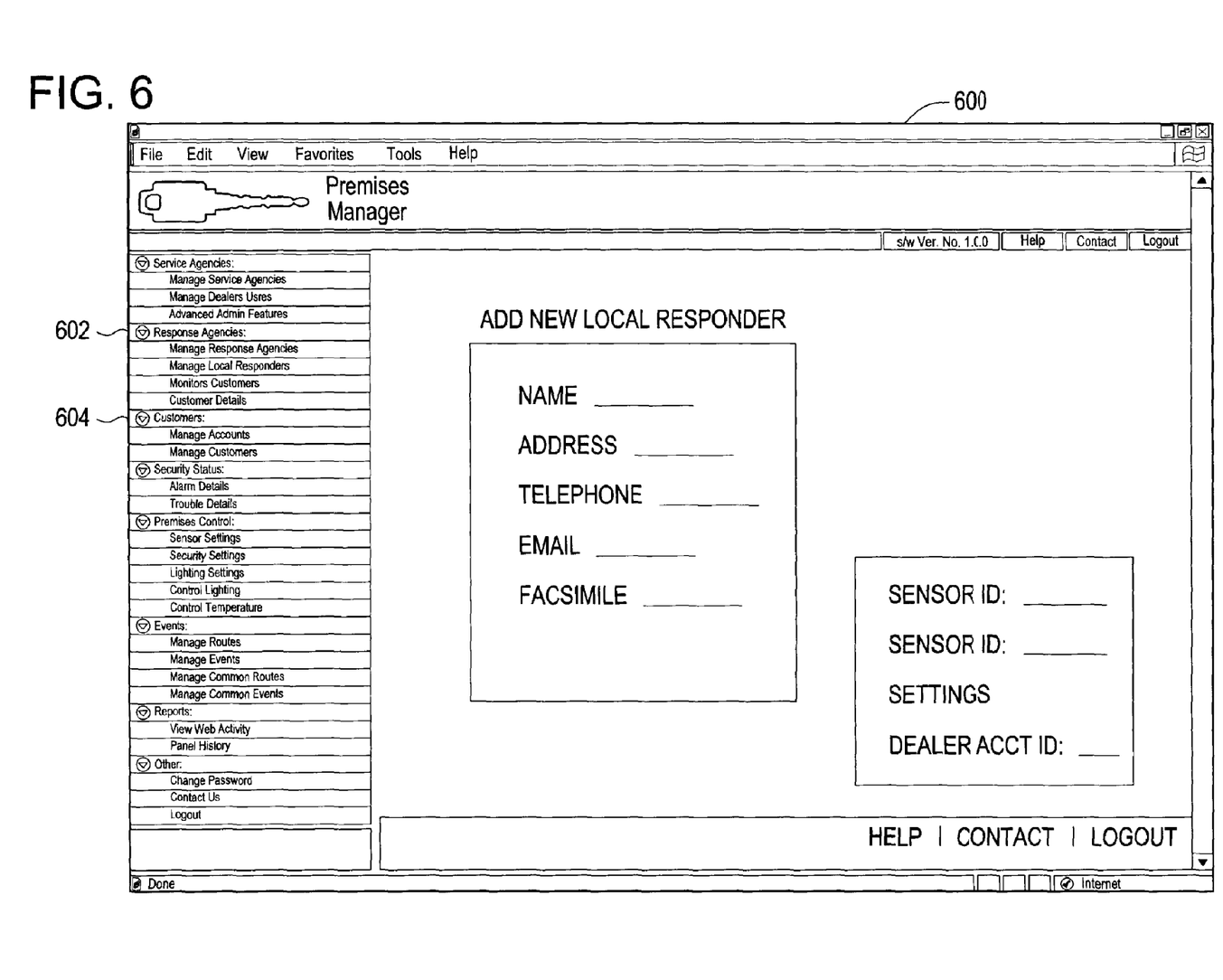
FIG. 6 is a user interface screen depicting sample data and options available to a service entity associated with the security system in exemplary embodiments.

At step 318, the service entity (or optionally, the dealer) receives a request to add a local responder to the dealer account via, e.g., the web site of host system 104. The service entity (or dealer) logs into the security application 114 and a user interface screen is presented to the service entity (or dealer) based upon the service entity (or dealer) role assignment. A sample user interface screen as seen by the service entity is shown in FIG. 6. At step 320, the service entity enters information relating to the local responder (e.g., identification, address, contact information, etc.) via option 602 of user interface screen 600 (or optionally via option 504 if entered by the dealer) and the saves the information in the dealer account record. Once the local responder information has been entered, the security application 114 automatically provisions access permissions to the local responder based upon the assigned local responder role at step 322. The local responder information is then stored in the dealer account record in storage device 108 at step 324. Steps 318-324 may be repeated for each new local responder request received by the service entity (or dealer). Based upon the local responder role assignment, the local responder may now access selected information and systems via the security application 114.

Figure 7:
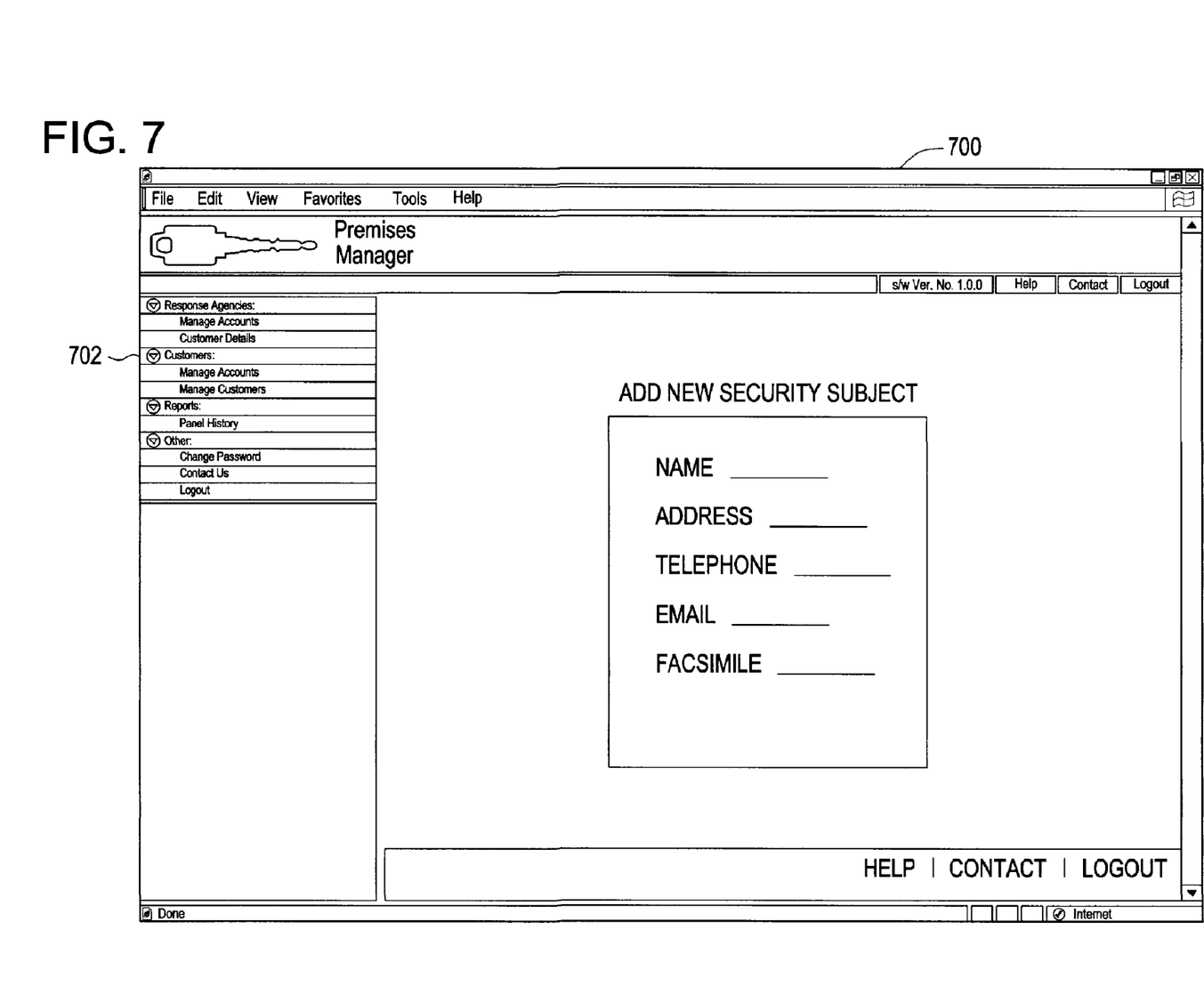
FIG. 7 is a user interface screen depicting sample data and options available to a local responder associated with the security system in exemplary embodiments.

At step 326, the local responder (or optionally, either of the service entity or dealer) receives a request to add a security subject to the dealer account via, e.g., the web site of host system 104. The local responder (or service entity/dealer) logs into the security application 114 and a user interface screen is presented to the local responder (or service entity/dealer) based upon the local responder (or service entity/dealer) role assignment. A sample user interface screen as seen by the local responder is shown in FIG. 7. At step 328, the local responder enters information relating to the security subject (e.g., identification, address, contact information, etc.) via option 702 of user interface screen 700 (or optionally via option 604 of user interface screen 600 of FIG. 6 if entered by the service entity, or option 506 of user interface screen 500 of FIG. 5, if entered by the dealer) and the saves the information in the dealer account record. Once the security subject information has been entered, the security application 114 automatically provisions access permissions to the security subject based upon the assigned security subject role at step 330. The security subject information is then stored in a security subject account record at step 332 and the dealer account record at step 334, both of which are stored in storage device 108. Steps 326-334 may be repeated for each new security subject request received by the local responder (or service entity/dealer). Based upon the security subject role assignment, the security subject may now access selected information and systems via the security application 114.

Figure 8:
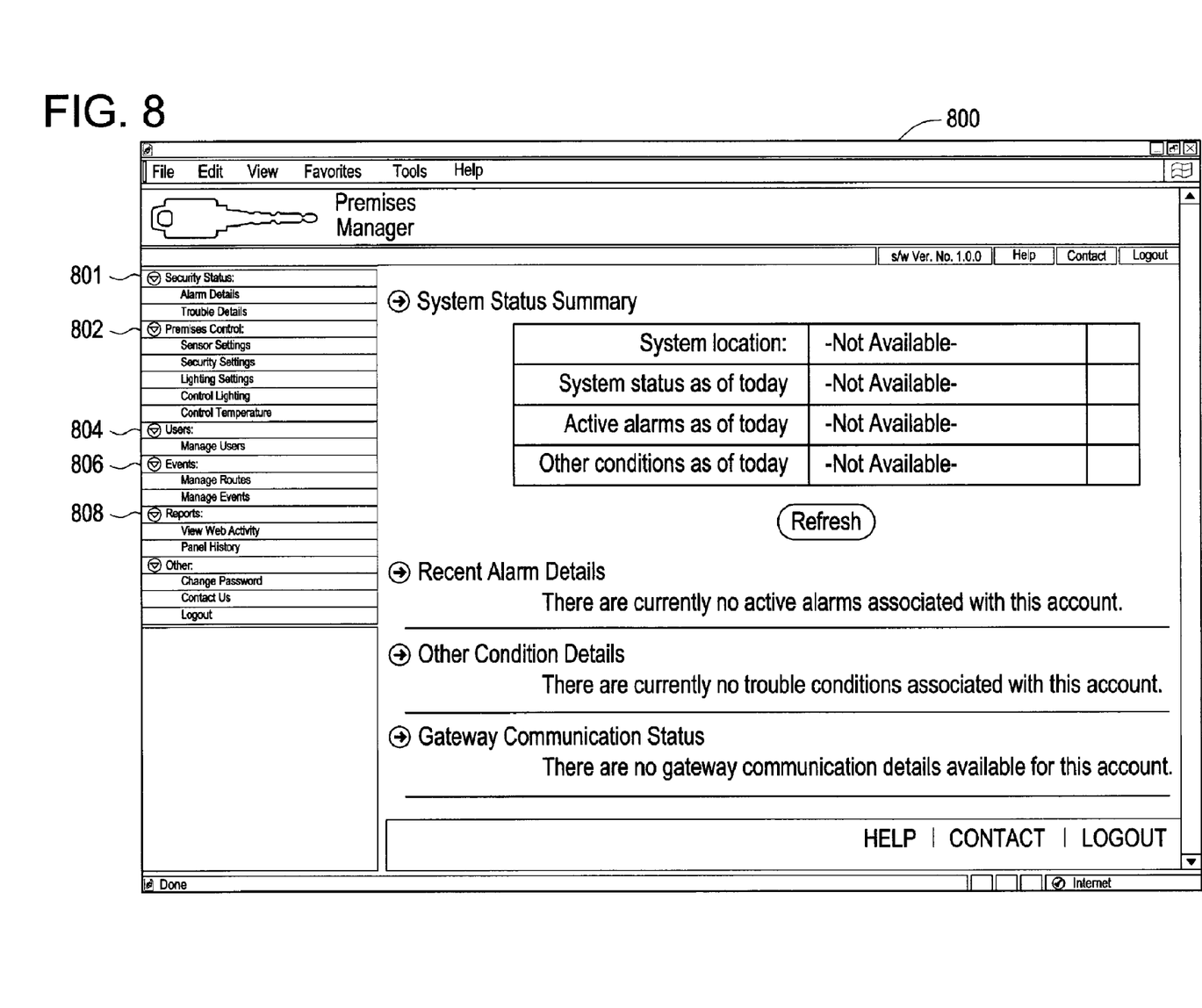
FIG. 8 is a user interface screen depicting sample data and options available to a security subject associated with the security system in exemplary embodiments.

At step 336, the security subject (or optionally, the service entity) requests to program settings for a security panel. A user interface is presented to the security subject (or service entity), a sample of which is shown in FIG. 8. The security subject enters the desired settings via one or more of options 802-806 at step 338. Options include "Premises Control"

802, for applying settings for sensors, security, lighting, lighting control, and temperature. Options further include setting up and modifying user settings via "Users" 704. Additional options include setting up notification routes and events via "Events" 806 (e.g., send email if motion detector is activated, send pager message if window sensor is activated, alert authorities if audio sensor (glass breaking) is activated). Other information available to an authorized user of the security panel 116 include alarm and trouble details via "Security Status" 801 and viewing web and panel activities via "Reports" 808. As shown in the user interface screen 800 of FIG. 8, the user has selected security status information via option 801 which displays a system status summary, alarm details, other conditions, and gateway communication status information. Once the settings have been selected, they are stored in the security subject and dealer account records at step 340.

As described above, the security management system of the present invention facilitates multi-tiered management of security systems. The administrator level, dealer level, service entity level, local responder level, and security subject level each performs a pre-defined set of activities and, together, provides an end-to-end security management system for customer accounts.

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention.

An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. The technical effect of the executable code is to facilitate security management and control processes for security systems.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing multi-tiered management of security systems, said method comprising:
    listing activities for implementing a security management system;
    identifying information, systems, and processes needed to execute the activities;
    defining a set of roles and associating selected activities with each role in the set of roles, the set of roles including an administrator role, a dealer role, a service entity role, a local responder role, and a security subject role;
    assigning access capabilities for each role based upon the associated activities and corresponding information, systems, and process requirements; and
    storing results of the listing, identifying, defining, and assigning in a role assignment database.

2. The method of claim 1, wherein assigning access capabilities for each of the roles comprises providing the administrator role with permissions to add, modify, and delete accounts, the accounts including dealer accounts and security subject accounts.

3. The method of claim 1, wherein listing activities comprises listing activities including:
    installing, maintaining, and repairing security system equipment;
    monitoring security system equipment;
    monitoring conditions and events via the security system equipment;
    generating alerts;
    selecting and applying security panel settings; and
    administering and operating security system applications and a network connecting the security system applications.

4. The method of claim 3, wherein selecting security panel settings comprises:
    associating automated systems with a security panel, the automated systems including at least one of:
        window opening and closing devices;
        door opening and closing devices;
        lighting elements; and
        appliances; and
    selecting a means of notification upon occurrence of a condition.

5. The method of claim 3, wherein installing, maintaining, and repairing security system equipment comprises installing, maintaining, and repairing security system equipment including:
    a security panel;
    sensors;
    a monitor; and
    security software and associated processor devices.

6. The method of claim 5, wherein installing, maintaining, and repairing security system equipment comprises installing, maintaining, and repairing sensors including at least one of:
    a door or window sensor;
    a motion detector;
    a fire or smoke detector;
    a water sensor;
    a temperature sensor; and
    an audio-based sensor operable for detecting breaking glass.

7. The method of claim 5, wherein installing, maintaining, and repair security system equipment comprises installing, maintaining, and repairing the security panel including:
    a control panel;
    a keypad;

a display device;
clock functions;
an alarm;
a speaker; and
a microphone.

8. The method of claim 7, wherein installing, maintaining, and repair security system equipment further comprises installing, maintaining, and repairing the security panel including a processor.

9. A system for implementing multi-tiered management of security systems, said system comprising:
   a data storage device; and
   a host system in communication with said data storage device, said host system executing instructions comprising:
   receiving a list of activities for implementing a security management system;
   identifying information, systems, and processes needed to execute the activities;
   associating selected activities with a defined set of roles, the defined set of roles including an administrator role, a dealer role, a service entity role, a local responder role, and a security subject role;
   assigning access capabilities for each role of the defined set of roles based upon the associated activities and corresponding information, systems, and process requirements; and
   storing the list of activities, the identified information, systems, and processes, the defined set of roles, and the assigned access capabilities in a role assignment database of said data storage device.

10. The system of claim 9, wherein the access capabilities for each role include providing the administrator role with permissions to add, modify, and delete accounts, the accounts including dealer accounts and security subject accounts.

11. The system of claim 9, wherein the list of activities includes:
   installing, maintaining, and repairing security system equipment;
   monitoring security system equipment;
   monitoring conditions and events via the security system equipment;
   generating alerts;
   selecting and applying security panel settings; and
   administering and operating security system applications and network.

12. The system of claim 11, wherein security panel settings include:
   associating automated systems with a security panel, the automated systems including at least one of:
   window opening and closing devices;
   door opening and closing devices;
   lighting elements; and
   appliances; and
   selecting a means of notification upon occurrence of a condition.

13. The system of claim 11, wherein the security system equipment includes:
   a security panel;
   sensors;
   a monitor; and
   security software and associated processor devices.

14. The system of claim 13, wherein the sensors include at least one of:
   a door or window sensor;
   a motion detector;
   a fire or smoke detector;
   a water sensor;
   a temperature sensor; and
   an audio-based sensor operable for detecting breaking glass.

15. The system of claim 13, wherein the security panel includes:
   a control panel;
   a keypad;
   a display device;
   clock functions;
   an alarm;
   a speaker; and
   a microphone.

16. the system of claim 13, wherein the security panel further includes a processor.

17. A computer program embodied on a computer readable medium for implementing multi-tiered management of security systems, said computer program comprising at least one code segment for:
   receiving a list of activities for implementing a security management system;
   identifying information, systems, and processes needed to execute the activities;
   associating selected activities with a defined set of roles, the defined set of roles including an administrator role, a dealer role, a service entity role, a local responder role, and a security subject role;
   assigning access capabilities for each role of the defined set of roles based upon the associated activities and corresponding information, systems, and process requirements; and
   storing results of the listing, identifying, defining, and assigning in a role assignment database.

18. The computer program of claim 17, further comprising at least one code segment for assigning access capabilities for each of the roles by providing the administrator role with permissions to add, modify, and delete accounts, the accounts including dealer accounts and security subject accounts.

19. The computer program of claim 17, further comprising at least one code segment for listing activities including:
   installing, maintaining, and repairing security system equipment;
   monitoring the security system equipment;
   monitoring conditions and events via the security system equipment;
   generating alerts;
   selecting and applying security panel settings; and
   administering and operating security system applications and a network connecting the security system applications.

20. The computer program of claim 19, further comprising at least one code segment for:
   associating automated systems with a security panel, the automated systems including at least one of:
   window opening and closing devices;
   door opening and closing devices;
   lighting elements; and
   appliances; and
   selecting a means of notification upon occurrence of a condition.

* * * * *